K. SCHMARJE.
ROLLER CONTACT FOR ELECTRIC WELDING MACHINES.
APPLICATION FILED MAR. 13, 1913.
1,097,883.
Patented May 26, 1914.
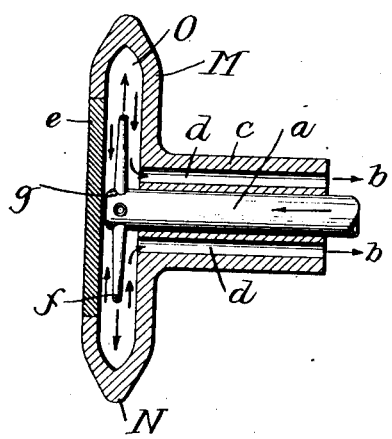
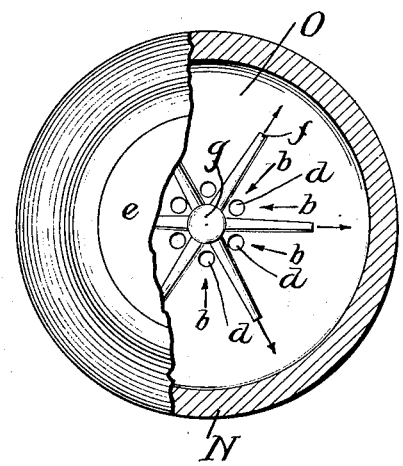

UNITED STATES PATENT OFFICE.

KONRAD SCHMARJE, OF FRANKFORT, GERMANY, ASSIGNOR TO THOMSON ELECTRIC WELDING COMPANY, OF LYNN, MASSACHUSETTS, A CORPORATION OF MASSACHUSETTS.

ROLLER-CONTACT FOR ELECTRIC WELDING-MACHINES.

1,097,883.

Specification of Letters Patent.   Patented May 26, 1914.

Application filed March 13, 1913.   Serial No. 753,954.

*To all whom it may concern:*

Be it known that I, KONRAD SCHMARJE, a subject of the Emperor of Germany, and a resident of Frankfort, Germany, have invented certain new and useful Improvements in Roller-Contacts for Electric Welding-Machines, of which the following is a specification.

This invention relates to cooling means for the contact electrodes of electric welding machines and particularly relates to the cooling of large roller contacts such as used in electric seam welding apparatus.

Heretofore, resultant from continuous use of roller contacts in seam welding apparatus, difficulty has been experienced in keeping the work contacting edge of the roller properly cooled by the ordinary methods. Up to the present this cooling of the edge of the contact has ordinarily been accomplished by making the contact hollow and forcing water into the hollow chamber allowing it to circulate around the chamber according to its own free will. The cooling has also been carried out by dividing the chamber formed within the roll into two chambers and feeding the cooling-water through pipes into one chamber and allowing it to escape through the other chamber. By any of these methods it was not possible to regulate the circulation of the water and a great quantity of water had to be used without even being certain that the edge of the roll was really much benefited. Owing to continuous use, if the edge of the roller contact is not kept cool it quickly flattens and loses its shape and wears away, thus making it necessary to re-shape or trim the edge very often and also to re-adjust the parts owing to the quick wear.

The object of the present invention is to overcome the above disadvantages, save cooling-water and more satisfactorily maintain the shape of the contact surface of the roll and increase its durability.

To these ends the invention consists in the improved cooling devices for electric welding machines and in the details of construction and combinations of parts hereinafter more particularly described and then specified in the claims.

In the accompanying drawings, Figure 1 is a cross-section through a roller contact for electric welding machines constructed in accordance with this invention. Fig. 2 is a partial front elevation and partial section through the roll.

The invention is herein illustrated in more or less diagrammatic form, the manner that the roller contact operates in an electric welding machine to weld seams being now well-understood in the art and as the invention is applicable to any suitable type of apparatus, any detailed illustration or description of the mounting or specific operation of the roller contact is deemed unnecessary and is dispensed with.

$a$ indicates a hollow stationary shaft upon which the axis $c$ of the roller contact M preferably rotates. The roller contact 70 might be of any desirable form and is here shown as comprising a continuous edge N which contacts with the work and welds the same in any of the manners now common and well-known in the electric welding art. The roller M is provided with a hollow chamber $o$ in which is located a plurality of nozzles or spouts radiating laterally from the end of the hollow shaft $a$ and forming a general star arrangement. The forward end of the hollow shaft $a$ is closed by a cover as at $g$ and the spouts or nozzles $f$ are in communication with the interior of said shaft. A sufficiently large opening is provided in the front face of the roller to permit the insertion of the star-shaped spout arrangement, after which the opening is closed by a cover plate $c$ suitably secured in place.

Water is conducted or forced through the hollow shaft $a$ and by means of the nozzles $f$ is forced directly against the inner wall of the contacting edge N. The water then flows along the walls toward the axis and leaves the roll through openings or passages $d$ bored in the axis $c$ of the roll M. The openings or passages $d$ are preferably disposed near the shaft $a$ and are concentrically arranged around said shaft remote from the discharge nozzles of the spout arms $f$. It will thus be seen that owing to this arrangement, the fresh water is forced directly against the hottest part of the roll, namely the edge, without taking up any heat in other places before reaching the edge. As the water is thus caused to flow in a certain definite way, the entire edge is cooled evenly and no concentration of heat along the edge takes place.

It will be understood that the invention might be carried into effect in various ways and that it is not limited to being carried into effect by the specific constructions shown which are for the purpose of illustration only.

What I claim as my invention is:

1. In a roller contact for electric welding machines, means for directing cooling water directly against the inner surface of the contacting edge of the roller before it contacts with other parts thereof.

2. A roller contact for electric welding machines having a hollow chamber and a plurality of radially disposed spouts adapted to direct cooling water against the edge of said roller.

3. In an electric welding machine, a hollow roller contact, a hollow shaft on which said roller rotates and a stationary star-shaped series of nozzles within said roller and adapted to deliver water direct to the edge of said roller.

4. In an electric welding machine, the combination of a stationary hollow shaft, a hollow roller contact rotating on said shaft, a plurality of radially disposed nozzles on the end of said shaft within the roller contact and adapted to deliver cooling water to the contact edge of said roller and means remote from said edge for drawing off the water.

Signed at Frankfort-on-the-Main, Germany, this 21st day of February, A. D. 1913.

KONRAD SCHMARJE.

Witnesses:
OSKAR MIKSOHKS,
ALBERT JANSKE.